United States Patent [19]
Pauken et al.

[11] Patent Number: 5,558,845
[45] Date of Patent: Sep. 24, 1996

[54] FILM PUMP FOR APPLYING A MONOLAYER FILM OVER WATER SURFACES

[75] Inventors: Michael T. Pauken; Sheldon M. Jeter, both of Atlanta; Said I. Abdel-Khalik, Tucker, all of Ga.

[73] Assignee: Georgia Tech Research Corp., Atlanta, Ga.

[21] Appl. No.: 281,412

[22] Filed: Jul. 27, 1994

[51] Int. Cl.$^6$ ..................................................... B01D 11/04

[52] U.S. Cl. ............................... 422/256; 118/52; 118/56; 118/319; 118/402; 405/52; 422/42; 422/43; 422/259; 588/249

[58] Field of Search ................................. 422/40, 41, 42, 422/43, 256–259; 118/52, 56, 319, 320, 402; 405/52; 588/249

[56] References Cited

U.S. PATENT DOCUMENTS

| | | | |
|---|---|---|---|
| 2,878,098 | 3/1959 | Treloar et al. | 422/43 X |
| 2,903,330 | 9/1959 | Dressler | 422/43 |
| 3,082,058 | 3/1963 | Rosano | 422/43 |
| 3,231,325 | 1/1966 | Oster | 422/43 |
| 3,285,692 | 11/1966 | Robertson | 21/61 |
| 3,353,610 | 11/1967 | Vidal | 170/8 |
| 3,425,791 | 2/1969 | Koberg | 422/43 |
| 3,528,764 | 9/1970 | Reiser | 422/43 |
| 4,455,226 | 6/1984 | Lahav | 210/170 |
| 4,674,436 | 6/1987 | Miyazaki et al. | 118/402 |
| 5,300,329 | 4/1994 | Kinnunen | 118/402 X |

FOREIGN PATENT DOCUMENTS 217139  9/1958  Australia .

OTHER PUBLICATIONS

Lugton and Vines, The Spreading of Surface Films from Solutions of Cetyl Alcohol, Dec. 1960.

*Primary Examiner*—Robert Warden
*Assistant Examiner*—Krisanne M. Thornton
*Attorney, Agent, or Firm*—Deveau, Colton & Marquis

[57] ABSTRACT

A device for applying an evaporation-inhibiting film to an exposed liquid surface of a liquid body, which includes an impeller disposed below and coplanar with the exposed liquid surface; means for rotating said impeller; means for delivering the evaporation-inhibiting film to the exposed liquid surface at a location immediately above said impeller; and means for bringing liquid from beneath the exposed surface of the liquid body to above said impeller.

19 Claims, 3 Drawing Sheets

FILM PUMP FOR APPLYING A MONOLAYER FILM OVER WATER SURFACES

BACKGROUND OF THE INVENTION

1. Field of the Invention

This invention is related generally to a device for reducing the rate of evaporation from fluid storage basins, and more particularly to a film pump capable of producing a stable monolayer film over large water surfaces with complex surface geometries to reduce evaporation loss.

2. Prior Art

Evaporation from bodies of fluids, such as reservoirs, holding tanks, and the like, can be reduced by covering the fluid surface with a film of a liquid having a lower vapor pressure than the fluid covered. For example, the use of films of cetyl alcohol on the surface of bodies of water to reduce evaporation loss is well known. Likewise, previous inventions have used various methods for application of the film to the water surface.

Australian Patent No. 217,139 to Mansfield discloses a method for reducing the rate of evaporation from a body of water by use of a carder of a fibrous nature such as cotton to which cetyl alcohol or another active material has been applied. The carrier is floated on the body of water so that the active material may spread across the surface of water.

U.S. Pat. No. 2,878,098 to Treloar et al. discloses means for preventing evaporation from reservoirs or the like by use of a plurality of dispensing units anchored around the perimeter of the area to be protected. The dispensing traits are provided with a protective film-forming substance such as cetyl alcohol stored in a supply tank connected to the dispensing unit. In one embodiment, release of the film-forming substance is controlled by wind pressure applied to a wind vane on the dispensing unit. When sufficient wind pressure is applied to the wind vane, a normally closed valve is opened to release the film-forming substance so as to form a film on the surface of the water. In another embodiment, a paddle wheel assembly is used to control the release of the protective film-forming substance from the dispensing unit in response to the amount of water current.

U.S. Pat. No. 3,285,692 to Robertson discloses an apparatus for distributing material to reduce evaporation from water storage basins comprising a hopper in which a block of film-producing material such as hexadecanol is provided, a housing having an assembly of rotating brushes which form small particles of hexadecanol when bristles of the brush assembly come in contact with the solid hexadecanol stored in the hopper, and an outlet connected to the housing for discharging the small particles of hexadecanol from the housing. The brush assembly is rotated at a speed of about 3,000 rpm by an internal combustion engine connected to a spindle on which the brush assembly is installed.

U.S. Pat. No. 3,528,764 to Reiser discloses a method and apparatus for retarding evaporation from water surfaces based on the concept of providing small fragments of an oleaginous material to a stream of water so as to form an emulsion of the oleaginous material and water. The emulsion is then sprayed onto the body of water to be protected preferably by a line of sprayers mounted around the perimeter of the body of water. The sprayers may be activated in response to the wind.

U.S. Pat. No. 4,455,226 to Lahav discloses a method and apparatus for treating the surface of a solar pond with oil. The method involves applying the oil to the surface of the pond, collecting the oil, and purifying the oil with filtration means to remove particles collected from the surface of the pond. The purified oil is then reapplied to further remove debris.

U.S. Pat. No. 3,353,610 to Vidal discloses a liquid film maintaining apparatus for redistributing a protective coating applied to a body of water so as to prevent evaporation. The apparatus includes a plurality of circular float members disposed on the surface of the body of water. A protective film which is already applied to the surface of the water is partially maintained by each member. The portion of the protective film so enclosed is retained on the body of water and generally not displaced by wind current.

These existing methods for applying films to the water surface, because of their dependence on water current or wind for film distribution, have difficulty spreading the film over pools with large or irregular surface geometries. Existing film spreading devices have difficulty spreading alcohols of longer carbon chain length such as eicosanol (C-20) and docosanol (C-22) into an effective film layer because of the higher molecular weight and greater viscosity of these alcohols. Another difficulty with previous devices is that they spread the film material on a water surface previously exposed to the ambient surroundings, which may be contaminated by airborne dust particles or other debris which inhibits the film layer's evaporation-retarding qualities, rather than to a fresh surface of water uncontaminated by airborne debris. Thus it can be seen that there is a need for a new and improved device for the application of a stable monolayer film over water surfaces with large or irregular surface geometries, which is not dependent on water current or wind for film distribution. It is to this need that the present invention is directed.

BRIEF SUMMARY OF THE INVENTION

Briefly described, in a preferred form, the invention is a device for producing a stable monolayer film of evaporation-inhibiting material for application to a water storage basin, thereby reducing the rate of evaporation from the water storage basin, comprising a rotating impeller which is preferably a flat disc submerged approximately one-quarter inch below the water's surface. The disc-shaped impeller is connected to a hub and drive-shaft assembly which is powered by a variable speed electric motor including a speed controller for controlling the speed of rotation of the impeller, enabling the impeller speed to be adjusted to maintain laminar flow at the edge of the impeller, thus providing a smooth water interface and not disrupting the continuity of the monolayer. As film material is delivered to the vicinity of the impeller, the rotation of the impeller moves the water immediately above the impeller outward, along the impeller surface, by means of centripetal force. The film material is applied to the moving water, and is forced outward and spread over the surface of the body of water by the centripetal force created by the impeller.

The device preferably also includes an annular plenum extending downward from the center of the rotating impeller, several inches below the water's surface. Water is drawn upward through this annulus from the basin to replace the water moving outward along the impeller surface as the impeller rotates, so as to be covered with the evaporation-inhibiting material. The advantage of this arrangement is that it provides a clean water surface for the application of the film material, rather than applying the film material to a water surface potentially contaminated by airborne dust particles or other debris which might inhibit the film layer's evaporation-retarding qualities. The arrangement also produces the surface to be covered and always produces a surface from below the surface of the basin, thus eliminating reliance on wind or moving devices to create or find a new surface area to cover. Thus, it is not necessary to move the device about the body of water, but the device can remain in one position, unlike many of the prior art devices. The device can include a reservoir of sufficient size to contain the required amount of film material. The film material is delivered from the reservoir through a delivery means, such as a tube which operates on the siphon principal, or by a pump, or by gravity. The delivery tube includes a valve for controlling the flow rate from the reservoir through the film delivery tube.

This device provides a means for applying a film layer which is well-suited for applications involving large water surfaces or complex surface geometries. As the impeller rotates, it spreads the film material into a monomolecular layer which moves outward along the impeller as the impeller rotates. As the film moves across the laminar interface at the edge of the impeller, it effectively pushes the monolayer outward, thus extending the monolayer to cover wide areas and fill in complex surface geometries. If a faster rate of film application is desired, several such devices may be operated in tandem, distributed at various points along the water surface.

Accordingly, it is an object of the present invention to provide a means, or film pump, for producing a monolayer of an evaporation-inhibiting film over large water surfaces or surfaces with complex geometries.

It is another object of the present invention to provide a film pump which will effectively spread alcohols of relatively longer carbon chain lengths into a film monolayer.

Yet another object of the present invention is to provide a film pump which spreads a film material over water drawn from below the water's surface in order to avoid contamination of the monolayer by airborne dust particles or other debris existing on the water's surface.

It is a further object of the present invention to provide a film pump which is not dependent on water current or wind for film distribution, nor dependent on moving the pump over the water surface.

It is another object of the present invention to provide a device for applying an evaporation-inhibiting monolayer film over water surfaces, which is simple in construction, durable in use and economical in manufacture.

These objects, and other objects, advantages, and features of the present invention, will become apparent to those skilled in the art upon reading the following specification in conjunction with the accompanying drawings wherein like reference numerals represent like parts throughout the several views.

DETAILED DESCRIPTION OF A PREFERRED EMBODIMENT

Figure 1:
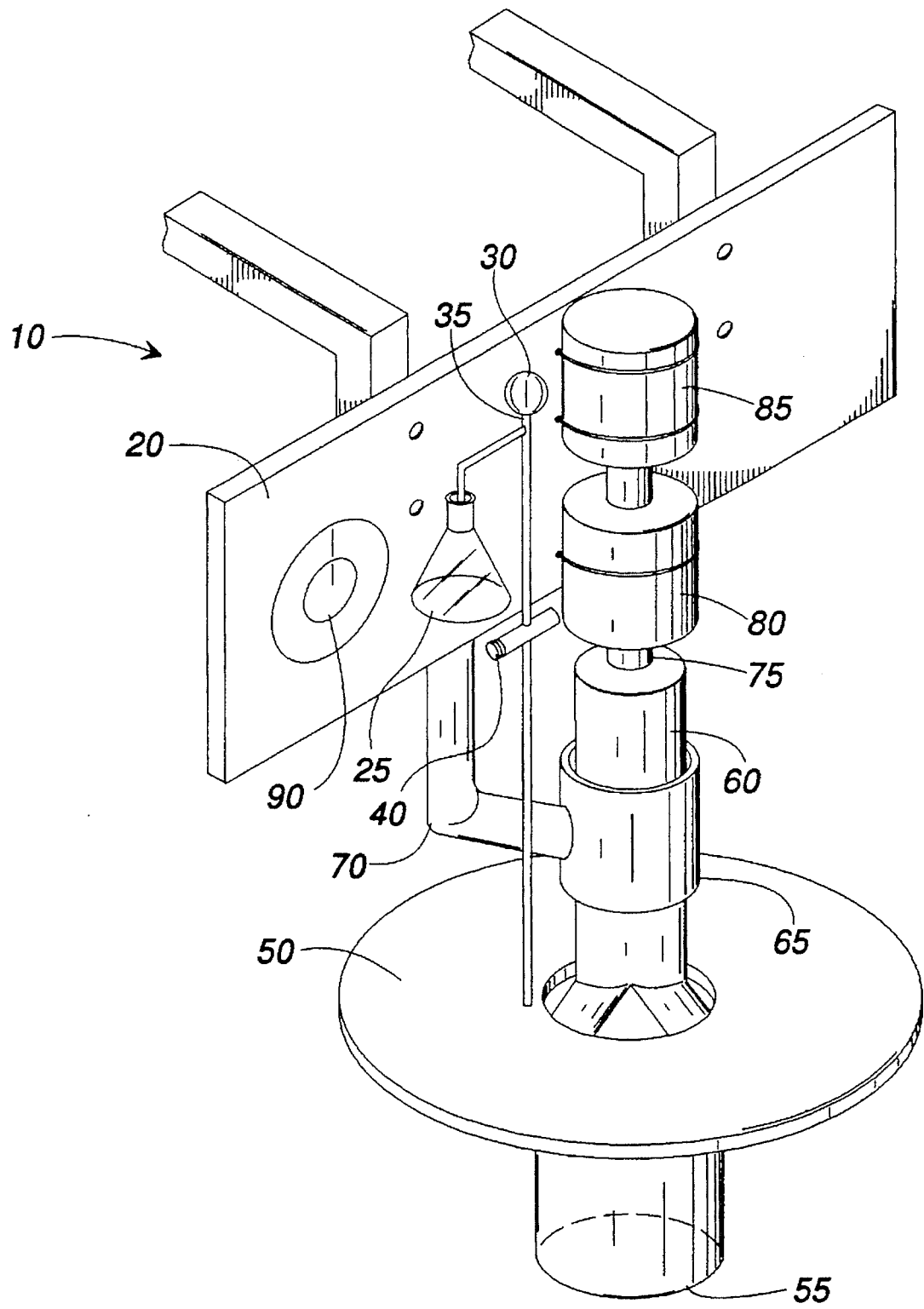
FIG. 1 is a perspective view of the film pump device according to a preferred embodiment of the invention.
Figure 2:
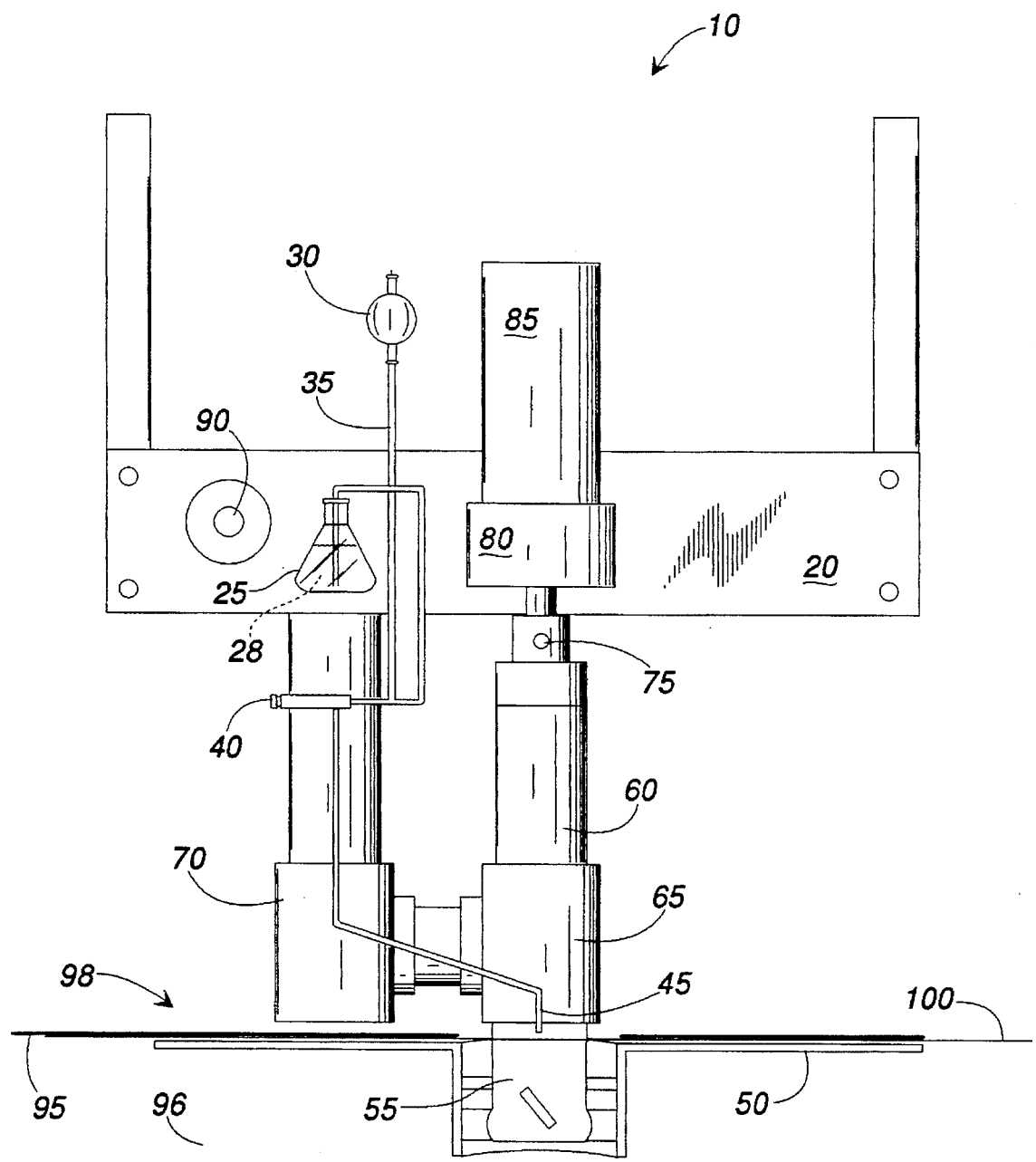
FIG. 2 is a side elevation, partly in section, of the film pump device according to a preferred embodiment of the invention.
Figure 3:
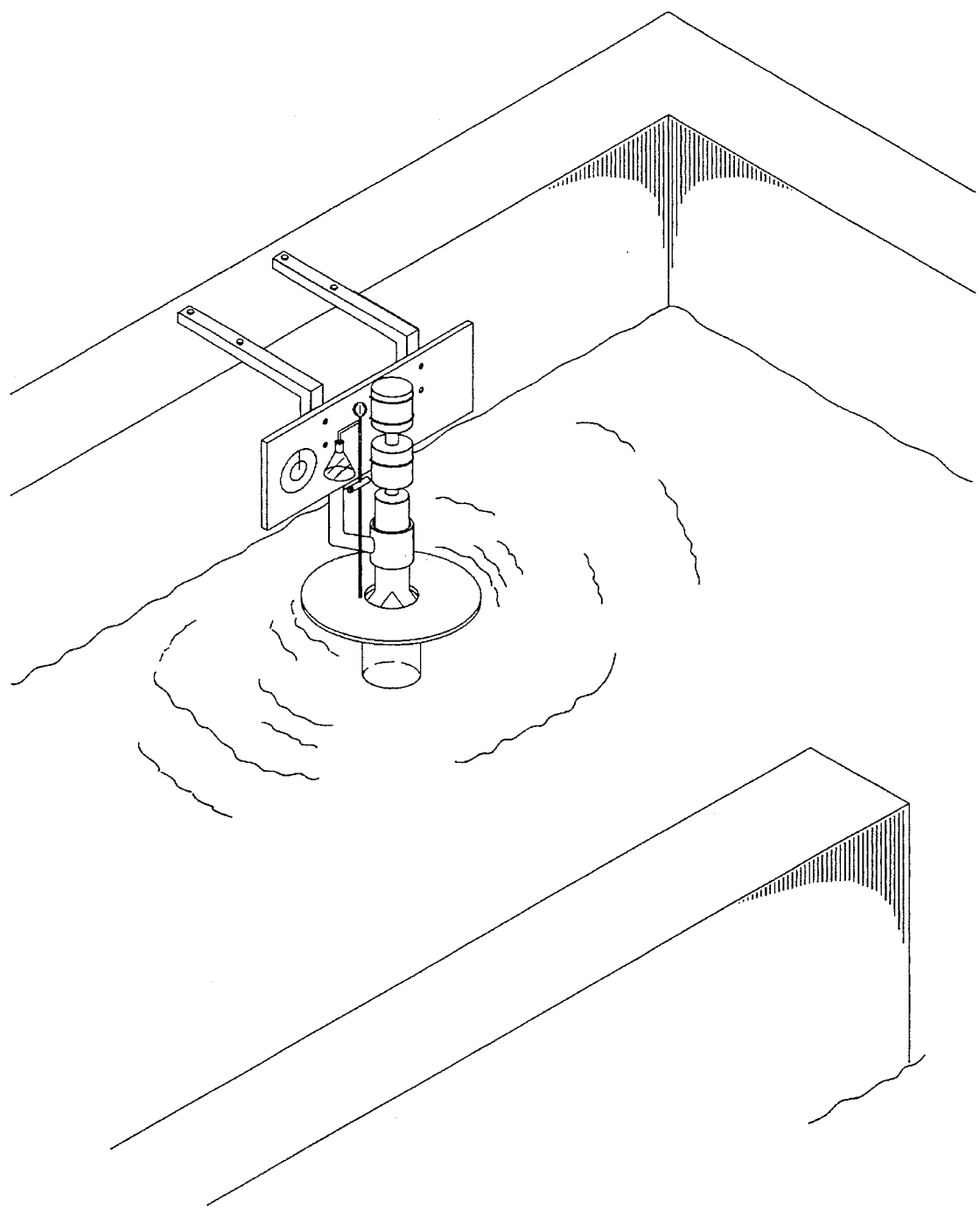
FIG. 3 is a perspective view of the film pump device in situ.

The present invention is a device for producing a stable monolayer film of evaporation-inhibiting material for application to a water storage basin, to reduce the rate of evaporation from the water storage bash. The device comprises a flat, disc-shaped, rotating impeller which can be of any suitable diameter. It has been found that disc diameters of approximately one to three feet (1'–3') (0.3 m–1.0 m) are suitable for most water storage basin applications, with a diameter of approximately two feet (2") (0.65 m) being an acceptable average diameter for most applications. The impeller is submerged approximately zero to one inch (0"–1") (0 cm–2.54 cm), and preferably one-quarter inch (0.25") (0.64 cm) below the water's surface.

The impeller is connected to a hub and drive-shaft assembly which is powered by a variable speed electric motor. A speed controller for controlling the speed of rotation of the impeller can be provided, enabling the impeller speed to be adjusted to maintain laminar flow at the edge of the impeller, thus providing a smooth interface for the application of the film to the water surface, and not disrupting the continuity of the monolayer. The rotation of the impeller moves the water immediately above the impeller outward, along the impeller surface, by means of centripetal force. Film material is delivered to the water surface immediately above the impeller, and as close to the center of the impeller as practical, and the film material is forced outward and spread over the surface of the body of water by the centripetal force created by the impeller. Thus, it is not necessary to move the device about the body of water, but the device can remain in one position, unlike many of the prior art devices.

The device includes a means for delivering water from the body of water to or near the surface of the body of water immediately above the impeller. It is preferable that the water delivered be taken from below the surface of the body of water to avoid the use of water potentially contaminated by airborne dust particles or other debris. The film material generally produces a better monolayer film in the absence of surface debris or impurities. It also is preferrable that the water delivered be delivered to approximately the center of the impeller, so as to produce a more even coverage of the body of water by the film material.

The means for delivering water from the body of water to the impeller can be of a variety of structures. For example, it can be a tube or series of tubes and a pump which brings water from elsewhere in the body of water. Alternatively it can be a viaduct structure leading to the device. Preferably, however, the means for delivering water is an annular plenum associated with the device, particularly through the center of the impeller. This allows water to be delivered from immediately below the device, which among other advantages, avoids producing detrimental currents in or wave patterns on the body of water.

The preferred annular plenum extends downward from the center of the rotating impeller approximately one to six inches (1"–6") (2.54 cm–15.24 cm) below the water's surface. Although the preferred depth the annulus extends into the basin is approximately three to four inches (3"–4") (7.62 cm–10.16 cm), the annulus can extend into the basin any distance as the annulus merely acts as a siphon bringing water from below the surface of the basin to the surface of the basin above the impeller. The plenum can be of any suitable diameter, and preferably is approximately one to six inches (1"–6") (2.54 cm–15.24 cm) in diameter, with a diameter of approximately two to four inches (2"–4") (5.08 cm–10.16 cm) being an acceptable average diameter for most applications.

Water is drawn upward through the annulus from the basin to replace the water moving outward along the impeller surface as the impeller rotates, so as to be covered with the evaporation-inhibiting material. This arrangement provides a clean water surface for the application of the film material, rather than a surface potentially contaminated by debris which might inhibit the film layer's evaporation-retarding qualities. The arrangement also produces the surface to be covered and always produces a surface from below the surface of the basin, thus eliminating reliance on wind or moving devices to create or find a new surface area to cover.

The device includes a means for delivering film material to the water surface, which can be of a variety of structures. For example, fill material can be delivered to the device from a supply line or reservoir located at a remote site. The device also can include a reservoir of sufficient size to contain the required amount of film material. The film material is delivered from the reservoir through a delivery means, such as a tube which operates on the siphon principal, or by a pump, or by gravity. The delivery tube includes a valve for controlling the flow rate from the reservoir through the film delivery tube.

This device provides a means for applying a film layer which is particularly well-suited for applications involving large water surfaces or complex surface geometries. As the impeller rotates, it efficiently spreads the film material into a monomolecular layer which moves outward along the impeller as the impeller rotates. As the film moves across the laminar interface at the edge of the impeller, it effectively pushes the monolayer outward, thus extending the monolayer to cover wide areas and fill in complex surface geometries. If a faster rate of film application is desired, several such devices may be operated in tandem, distributed at various points along the water surface.

Referring now to the drawing figures, a device 10 for applying a monolayer film 95 over water surfaces 100 according to a preferred form of the invention is shown. The device 10 comprises a rotating disc impeller 50 submerged immediately below and coplanar with water surface 100. Film solution 28 is delivered to water surface 100 above rotating disc impeller 50 by delivery means such as film delivery tube 45. As rotating disc impeller 50 is rotationally driven by driving means such as motor 85, film solution 28 is evenly distributed across water surface 100 above rotating disc impeller 50. Centripetal force imparted on water surface 100 by the rotation of rotating disc impeller 50 drives water surface 100 and the film solution 28 distributed thereon outward, thus creating a monolayer film 95. As water and film solution 28 are driven outward along the surface of rotating disc impeller 50, fresh water from the body of the basin 96, below water surface 100, is drawn through annular plenum 55 to provide a clean water surface for application of film solution 28.

The device 10 preferably is anchored at a point above the basin 96 by a suspended support fixture 20 which may be affixed overhead or otherwise suitably attached to surrounding structures. The support fixture 20 should be fabricated of structural material of sufficient strength and rigidity to provide adequate support for the device 10. Because the device 10 will generally be used in high humidity environments and in close proximity to the water's surface, the suspended support fixture 20 is preferably fabricated from PVC plastic, aluminum, or other corrosion-resistant material. The support fixture 20 may be attached to surrounding structures by bolts, clamps, or other standard fastening means. Alternatively, device 10 could be mounted on a floating support fixture anchored to the basin's floor, or could be attached to a boat and relocated as necessary throughout the body of water to be treated.

Film solution 28 may be contained in a reservoir 25 which is attached to suspended support fixture 20 by clamping or other standard attachment means. The reservoir 25 is of a size and construction adequate to hold a quantity of film solution 28 sufficient for the desired application. The reservoir 25 is preferably composed of glass or clear plastic so that the level of film solution 28 may be visually observed. Alternatively, film solution 28 can be supplied to the device 10 from an external solution containment means by pumping or other delivery means.

The film solution 28 is a surfactant, typically in solution with a solvent, and preferably a long chain fatty alcohol dissolved in ethanol. It has been found that under normal conditions the device 10 of the present invention operates best using a film solution of between 0.3 and 2.5 grams of octadecanol per 100 milliliters of ethanol. For water temperatures higher than 35° C. it has been found that longer chain alcohols such as eicosanol or docosanol may provide a higher level of evaporation suppression than octadecanol. Conversely, at lower water temperatures of approximately 25° C. and below, it has been found that hexadecanol may perform better than octadecanol.

The film solution 28 is delivered from the reservoir 25 to the water surface 100 through the film delivery tube 45 or other suitable delivery means. The film delivery tube 45 extends from reservoir 25 to a position immediately above water surface 100, and is preferably fabricated from flexible tubing such as Tygon brand tube. Reservoir 25 may be positioned at a higher vertical elevation than film delivery tube 45 discharge, in order that the film solution 28 may be dispensed by siphoning. Alternatively, film solution 28 may be delivered to water surface 100 by any suitable delivery means, such as pumping or gravity feeding. A squeeze bulb 30 for priming the siphon may be affixed to film delivery tube 45 by means of the squeeze bulb siphon tube 35, if a siphon is necessary, such as for gravity feed embodiments, or other non-mechanized feed embodiments. The film delivery tube incorporates a means for regulating the flow rate of film solution 28 to the water surface 100 such as needle valve 40. Likewise, any suitable regulating means can be incorporated, including for example, other types of valves. The film solution delivery rate is such that approximately 10 ml of the solution may be delivered in 3 to 10 minutes. Typically, 2 to 4 drops of the film solution are administered to the water surface per revolution of the impeller.

The rotating disc impeller 50 is positioned to be generally coplanar with water surface 100, and submerged immediately beneath the water surface 100. Rotating disc impeller 50 is preferably a thin, flat, circular disc fabricated from plastic, aluminum, or other corrosion resistant material. The impeller disc is limited in thickness only by the depth of the basin. However, it has been found that a disc having a thickness of between one-eighth of an inch to one inch (0.125"–1.0") (0.318 cm–2.54 cm) is an acceptable average thickness for most applications. The preferred disc thickness is approximately one-quarter inch (¼") (0.635 cm) as this combines the desired strength and stiffness qualities with economies of materials.

The annular plenum 55 extends perpendicularly from the planar surface of rotating disc impeller 50 and is concentric with the axis of rotating disc impeller 50. The top of annular plenum 55 preferably is coplanar with the upper surface of impeller 50, while the bottom of annular plenum 55 extends below the surface 100 of the basin into the body 96 of the basin. Annular plenum 55 should be of sufficient length to extend downward beneath water surface 100 to a depth from which clean uncontaminated water may be drawm. Annular plenum 55 may be fabricated as an integral part of rotating disc impeller 50 as by injection molding, or alternatively, may be fabricated as a separate component and attached to rotating disc impeller through standard attachment means such as adhesives, fasteners, or friction fitting. Annular plenum 55 also preferably is fabricated from PVC plastic, aluminum, or other corrosion resistant material.

Rotating disc impeller 50 and attached annular plenum 55, are rigidly coupled to one end of axle 60. Axle 60 is preferably a solid or hollow cylindrical shaft fabricated of corrosion resistant material of sufficient strength and rigidity to transmit mechanical force to the rotating disc impeller without significant deflection. Axle 60 is preferably supported proximal to the rotating disc impeller by support means such as bearing 65 to help insure that impeller 50 will rotate smoothly in a planar fashion, so as to maintain a relatively laminar surface to the water basin. In this manner, the monolayer film 95 will maintain its integrity as it is applied and forced outward over the surface 100 of the basin. Bearing 65 is preferably a journal-type bearing rigidly attached to support fixture 20 through means of a bearing support bracket 70. Beating 65 and bearing support bracket 70 are preferably fabricated from corrosion resistant material such as PVC plastic or aluminum. Bearing 65 is attached to bearing support bracket 70 through standard attachment means such as adhesives or fasteners, and to support fixture 20 by clamping, bolting or other standard attachment means.

Axle 60 is coupled with a driving means such as motor 85 and gear box 80 through the use of a coupling 75 or other attachment means mounted at the end of axle 60 distal from the rotating disc impeller 50 and annular plenum 55. Motor 85 and gear box 80 are rigidly attached to suspended support fixture 20 through standard attachment means such as clamping, bolting, or welding. Motor 85 is preferably a DC electric motor. Alternatively, an internal combustion engine or AC electric motor may be used as driving means. Motor 85 is preferably a variable speed motor incorporating a means for adjusting rotational speed such as speed controller 90. Speed controller 90 is electrically connected to motor 85, and may be mounted on suspended support fixture 20, or located elsewhere for remote operation.

In the device's preferred form, clean water is drawn from beneath the surface, through annular plenum 55, to the upper surface of rotating disc impeller 50. The speed of rotating disc impeller 50 is adjusted to maintain laminar flow across the outer edge of the impeller. The rotational speed is usually 6 to 25 rpm, with 12 rpm being the preferred rotational speed for a 2 feet (2')(0.61 m) diameter impeller. As water is centripetally urged across the impeller's surface, from the annular plenum 55 to the impeller edge, film solution 28 is delivered to, and evenly distributed across the water surface 100, thus creating a monolayer film 95. Rotating disc impeller 50 effectively pushes the monolayer film 95 outward, thus extending the monolayer to cover wide areas and fill in complex surface geometries.

The above detailed description of the preferred embodiment is for illustrative purposes only and is not intended to limit the scope or spirit of the invention and its equivalents as defined by the appended claims.

What is claimed is:

1. A device for applying an evaporation-inhibiting film to an exposed liquid surface of a liquid body, comprising:

a. an impeller disposed below and coplanar with an exposed liquid surface;
    b. means for rotating said impeller;
    c. means for delivering the evaporation-inhibiting film to an exposed liquid surface at a location immediately above said impeller; and
    d. means for bringing liquid from beneath the exposed surface of the liquid body to above said impeller.

2. A device according to claim 1, wherein said impeller comprises a disc.

3. A device according to claim 2, wherein said flat, disc-shaped impeller is between one and three feet in diameter, and between one-eighth inch and one inch in thickness.

4. A device according to claim 2, wherein said flat, disc-shaped impeller is approximately two feet in diameter and one-quarter inch in thickness.

5. A device according to claim 1, wherein said means for rotating said impeller comprise a mechanical driving means.

6. A device according to claim 5, wherein said mechanical driving means comprise a variable speed DC electric motor.

7. A device according to claim 1, wherein said means for delivering the evaporation-inhibiting film to the exposed liquid surface comprise a film material reservoir and a film delivery tube.

8. A device according to claim 7, wherein said film delivery tube further comprises a needle valve for controlling film delivery-rate.

9. A device according to claim 7, wherein said means for delivering the evaporation-inhibiting film to the exposed liquid surface comprise a siphon means.

10. A device according to claim 7, wherein said means for delivering the evaporation-inhibiting film to the exposed liquid surface comprise a pump.

11. A device according to claim 1, wherein said means for bringing liquid from beneath the exposed surface of the liquid body is a means for bringing liquid from beneath said impeller to above said impeller.

12. A device according to claim 11, wherein said means for bringing liquid from beneath said impeller to above said impeller comprises an annular plenum submerged beneath the exposed liquid surface.

13. A device according to claim 12, wherein said annular plenum comprises a hollow cylindrical tube perpendicular to said impeller, and concentrically oriented with an axis of the impeller.

14. A device according to claim 13, wherein said annular plenum is between one and six inches in length.

15. A device according to claim 13, wherein said annular plenum is between three and four inches in length.

16. A device according to claim 13, wherein said annular plenum is between one and six inches in diameter.

17. A device according to claim 13, wherein said annular plenum is between two and four inches in diameter.

18. A device according to claim 1, wherein said impeller is submerged between zero and one inch beneath the exposed liquid surface.

19. A device according to claim 1, wherein said impeller is submerged one-quarter inch beneath the exposed liquid surface.

* * * * *